United States Patent
Oh et al.

(10) Patent No.: US 8,275,894 B2
(45) Date of Patent: Sep. 25, 2012

(54) SYSTEM AND METHOD FOR PROVIDING LOCATION INFORMATION OF A TERMINAL

(75) Inventors: Jae-Kwon Oh, Seoul (KR); Wuk Kim, Gwacheon-si (KR); Joo-Young Kim, Suwon-si (KR)

(73) Assignee: Samsung Electronics Co., Ltd (KR)

(*) Notice: Subject to any disclaimer, the term of this patent is extended or adjusted under 35 U.S.C. 154(b) by 357 days.

(21) Appl. No.: 12/354,521

(22) Filed: Jan. 15, 2009

(65) Prior Publication Data

US 2010/0180039 A1    Jul. 15, 2010

(51) Int. Cl.
*G06F 15/16* (2006.01)

(52) U.S. Cl. ..... 709/228; 709/203; 709/227; 455/404.2; 455/456.1

(58) Field of Classification Search .......... 709/202–203, 709/227–229; 455/404.2, 456.1–456.3
See application file for complete search history.

(56) References Cited

U.S. PATENT DOCUMENTS

| | | | |
|---|---|---|---|
| 7,203,752 B2 * | 4/2007 | Rice et al. | 709/227 |
| 7,260,186 B2 * | 8/2007 | Zhu et al. | 455/404.2 |
| 7,305,365 B1 * | 12/2007 | Bhela et al. | 455/456.1 |
| 7,395,336 B1 * | 7/2008 | Santharam et al. | 709/227 |
| 7,930,342 B2 * | 4/2011 | Mattila et al. | 709/203 |
| 2005/0265276 A1 * | 12/2005 | Takeda et al. | 370/328 |
| 2006/0120320 A1 * | 6/2006 | Shim | 370/328 |
| 2007/0082681 A1 * | 4/2007 | Kim et al. | 709/203 |
| 2008/0182592 A1 * | 7/2008 | Cha et al. | 455/456.3 |
| 2010/0311438 A1 * | 12/2010 | Edge et al. | 455/456.1 |
| 2011/0028165 A1 * | 2/2011 | Ni | 709/203 |

* cited by examiner

*Primary Examiner* — Bharat N Barot
(74) *Attorney, Agent, or Firm* — The Farrell Law Firm, P.C.

(57) ABSTRACT

A common location service request/response method between various types of clients and location servers. A location request and a location estimate are delivered between a terminal and a location server using messages defined in a Session Initiation Protocol (SIP) protocol. In this manner, the terminal and server using the SIP protocol can easily send a request/response for location information, making it possible to provide a new service associated with the location service.

26 Claims, 9 Drawing Sheets

SYSTEM AND METHOD FOR PROVIDING LOCATION INFORMATION OF A TERMINAL

BACKGROUND OF THE INVENTION

1. Field of the Invention

The present invention relates generally to a system and method for providing location information, and in particular, to a system and method for providing location information of a terminal utilizing a Session Initiation Protocol (SIP) protocol.

2. Description of the Related Art

Various methods for location information requests and responses are available between a requestor (or client) that is requesting a location of a target terminal and a location server because each network may have a different location information request/response and location calculation process. Such request/response methods may also change according to the type of the location server. Therefore, a client generally uses different request/response methods according to the type of the location server, which often burdens a client terminal.

A Mobile Location Protocol (MLP) used in an Open Mobile Alliance Location (OMA LOC) working group is one example of a system for providing location information. The MLP, i.e., a protocol with a Transmission Control Protocol/Internet Protocol (TCP/IP) network used as a data delivery network, is used to request and deliver location service. More specifically, MLP is a location information request/response protocol used between a location server and a client terminal, by which Internet communication is usually performed. Accordingly, a client terminal connected to an Internet Protocol (IP) network can send a request for the location service to the location server and receive a response thereto using MLP. However, the client terminal can only send a request for the location service and receive a response thereto for a location server that uses the same request/response method as the terminal.

Because the type of the location server changes according to the type of the network, as described above, if a terminal is required to use a request/response method corresponding to each type of location server, this would be a heavy operation burden on the terminal. For example, a terminal and a location server in a Wideband Code Division Multiple Access (WCDMA) network should use a request/response method existing between them, and a separate location service request/response method exists even in a CDMA network. Likewise, MLP is also one of the location service request/response methods between a terminal connected to the IP network and a location server. If the terminal and the location server both have one unified request/response method, the terminal may receive location information using the various location servers.

When the location service is extended to other services, it is possible to provide enhanced services to users. For example, when location information of the terminal is provided during a voice call, it is possible to provide enhanced real-time voice service and multimedia service. A Session Initiation Protocol (SIP) protocol is used to provide the voice service, and the typical services using the SIP protocol include only the real-time voice service and the multimedia service. However, no detailed method has been proposed for the relevant standard technology for extending the SIP protocol to other services.

Accordingly, there is a demand for one common location information request/delivery method that would enable various types of clients and location servers to freely deliver location information requests/responses.

SUMMARY OF THE INVENTION

The present invention has been designed to address at least the problems and/or disadvantages described above, and to provide at least the advantages described below. Accordingly, an aspect of the present invention provides a system and method for providing location information of a terminal by providing a common location service request/response method between various types of clients and location servers.

Another aspect of the present invention provides a system and method for providing location information of a terminal by providing a location service request/response method using a SIP protocol.

In accordance with an aspect of the present invention, a system for providing location information of a terminal id provided. The system includes a client for sending a location request message for requesting a location of a target terminal; and a location server for, upon receipt of the location request message, determining whether a location request condition set by the client is included in the location request message, calculating location information of the target terminal, determining whether the location request condition is satisfied, when the location request condition is included in the location request message, and sending a location response message including the calculated location information to the client, when the location request condition is satisfied.

In accordance with another aspect of the present invention, a method for providing location information of a terminal in a system including a client, a target terminal, and a location server is provided. The method includes sending, by the client, a location request message for requesting a location of the target terminal; determining, by the location server, whether a location request condition set by the client is included in the received location request message; calculating, by the location server, location information of the target terminal, and determining whether the location request condition is satisfied, when the location request condition is included in the location request message; and sending, by the location server, a location response message including the calculated location information to the client, when the location request condition is satisfied.

In accordance with another aspect of the present invention, a system for providing location information of a terminal is provided. The system includes a client for sending a location request message for requesting a location of a target terminal; a requesting location server for sending the location request message depending information on a target terminal, designated in the location request message; and a home location server for transmitting location information acquired by location calculation with the designated target terminal to the requesting location server using a location response message. The requesting location server forwards the location response message to the client.

In accordance with another aspect of the present invention, a method for providing location information of a terminal in a system including a client, a target terminal, a requesting location server, and a home location server is provided. The method includes receiving a location request message from the client; analyzing, by the requesting location server, information on a target terminal, designated in the location request message; sending the location request message to a home location server managing the designated target terminal depending on the analysis result; sending, by the home location server, location information acquired by location calculation with the designated target terminal, to the requesting location server using a location response message; and forwarding, by the requesting location server, the location response message to the client.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS

Figure 1:
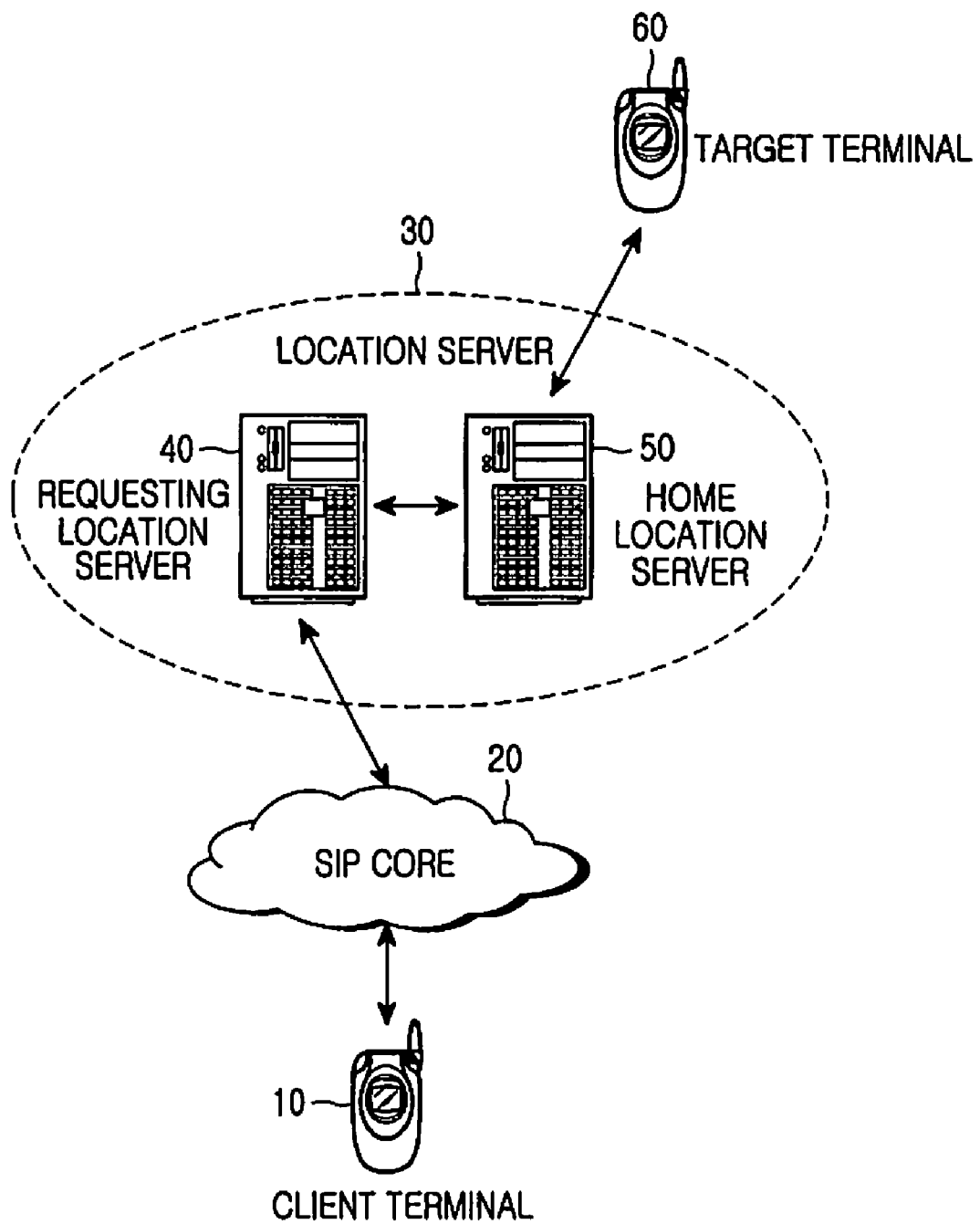
FIG. 1 is a diagram illustrating a system for providing location information according to an embodiment of the present invention.

Embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Embodiments of the present invention provide a method for providing a common location service request/response method between various types of clients and location servers. In a location service system, the "client", which is often software embedded in terminals or servers, refers to the entity that accesses a location server, sends a request for the main work or information to the location server, and receives the results in return. Therefore, such clients can be installed in various types of terminals and servers capable of serving as a requester that can request the location information.

In the present application, a location request and a location estimate are delivered between a client and a location server, using the messages used in a Session Initiation Protocol (SIP) protocol. Consequently, the terminal and the server using the SIP protocol can easily deliver request/response for location information, thereby making it possible to provide a new service interworking with the location service.

Before a description of the various embodiments of the present invention is given, the messages at the SIP protocol, used in the present application, will be described below.

SIP is used for capability exchange between the terminals, codec decision, and reservation of network resources, thereby enabling terminals to exchange real-time voice service, video, text, picture, etc., through the IP network. Such SIP is used for establishing a SIP session, and often, the SIP session is established as a network resource reservation is completed, after a codec and a data path to be used between the terminals are determined. The real-time voice service (or Voice over IP (VoIP)) and multimedia service are initiated through the established SIP session.

In addition, when particular information on a terminal of another party is needed, SIP sends a message to the other terminal in order to retrieve the desired information. A SIP message used for providing such information includes a SIP SUBSCRIBE message and a SIP NOTIFY message. The SIP SUBSCRIBE message is used for requesting particular information to the other party's terminal, while a SIP NOTIFY message is used for delivering particular information to the other party's terminal.

An embodiment of the present invention provides a method in which a requesting terminal (or client terminal) requests location information of the other party's terminal (or target terminal) using a SIP SUBSCRIBE message and the other party's terminal delivers the location information to the requesting terminal using a SIP NOTIFY message.

FIG. 1 is a diagram illustrating a system for providing location information according to an embodiment of the present invention As illustrated in FIG. 1, the system includes a client terminal 10 that requests location information, a SIP core 20, a location server 30 receiving the request, and a target terminal 60. The SIP core 20 forwards SIP messages between the client terminal 10 and the location server 30. Hence, the SIP core 20 is located between the client terminal 10 and the location server 30, and delivers the exchanged messages to the corresponding targets. The SIP core 20 delivers a SIP message that can include a recipient IDentifier (ID) expressed in a SIP Uniform Resource Identifier (URI) form to the corresponding target. Basically, the function of the SIP core 20 is the same as an operation of a normal SIP system.

The client terminal (or LoCation Service (LCS) client) 10 sends a request for location information of a particular terminal (or target terminal 60) to the location server 30, and receives corresponding location information. More specifically, the client terminal 10 sends a request for location information of the target terminal 60 to the location server 30, using SIP. Herein, the "LCS client" refers to a part in charge of requesting a location in the location service system. Although it is illustrated in FIG. 1 that the LCS client is embedded in the client terminal 10, by way of example, the LCS client can also be installed in the server. The server in which the LCS client is embedded becomes a client server that communicates with the location server 30 using SIP. Therefore, the client terminal 10, in which the LCS client is embedded in FIG. 1, can be replaced with the client server.

When requesting location information, the client terminal 10 can suggest various conditions to the location server 30. The conditions include conditions on a target terminal ID (one or multiple IDs), location information of which the client terminal 10 is to receive, accuracy of the location information, and a report through which the client terminal 10 will receive the location information. For example, the number of reports and the time at which the client terminal 10 intends to receive the location information can be suggested as the conditions on a report through which the client terminal 10 receives the location information. In some cases, the conditions used for requesting location information have similar types even though they are different in the location information request/response method. Therefore, in accordance with an embodiment of the present invention, the conditions defined in the MLP v3.2 of OMA LOC Working Group are used as the conditions used for requesting location information.

The location server 30, i.e., an entity used during location calculation for a terminal, refers to the normal location server, and it is not intended to limit the present invention to a type of the location server. In particular, the location server 30 according to the present invention includes a requesting location server 40 and a home location server 50. The requesting location server 40 controls a location information request from the client terminal 10. When the client terminal 10 is subscribed to the requesting location server 40, the requesting location server 40 stores information such as ID and service authorization of the client terminal 10. For mutual authentication with the client terminal 10, the requesting location server 40 stores an authentication key and a data encryption key in a memory. Similarly, the client terminal 10 also has an ID of the requesting location server 40 and a contact address to which it can deliver a location information request message, and stores an authentication key and a data encryption key for authentication with the requesting location server 40. Because a normal authentication method between a client and a server is used as the mutual authentication method, a detailed description thereof will be omitted herein.

The requesting location server 40 checks if the client terminal 10 has authorization to request location information. After the authentication and the authorization check are completed, the requesting location server 40 finds a location server that performs positioning on a target terminal using a target terminal's ID in the request message from the client terminal 10. The location server that performs positioning on the target terminal corresponds to a home location server, and the requesting location server 40 forwards the location information request message provided from the client terminal 10 to the home location server 50. Upon receiving location information or the positioning result from the home location server 50, the requesting location server 40 delivers the location information to the client terminal 10.

The home location server 50, i.e., a location server controlling positioning for the target terminal 60, calculates location information of the target terminal 60. Upon receiving a request message for location information of the target terminal 60 from the requesting location server 40 or the client terminal 10, the home location server 50 performs a positioning process on the target terminal 60. Specifically, the home location server 50 performs an authorization check using the ID of the client terminal 10 to determine if the client terminal 10 is authorized to request a location of the target terminal 60. If the client terminal 10 is authorized, the home location server 50 detects an ID of the target terminal 60, included in the location information request message. Subsequently, the home location server 50 checks a data path of the target terminal 60 using the ID of the target terminal 60, and then determines if it can calculate location information of the target terminal 60 using the data path. If the target terminal 60 is located in the area managed by the home location server 50, the home location server 50 sends a message indicating a start of calculating the location information to the target terminal 60. For example, this message can include an ID of a terminal requesting location information, accuracy of the location information, and a delivery condition of a report.

However, when the target terminal 60 leaves the area covered by the home location server 50, the home location server 50 can forward the location request message to another location server in charge of the area where the target terminal 60 has moved to.

A description of an embodiment of the present invention will be made herein for a scenario in which the home location server 50 calculates location information of the target terminal 60 located in its coverage area. However, the proposed method of using a SIP SUBSCRIBE message and a SIP NOTIFY message can be applied in the same way even to a scenario in which the home location server 50 performs positioning by forwarding the location information request message to another location server because calculating the location information of the target terminal 60 by the home location server 50 is similar to the existing location information calculation process.

The target terminal 60, location information of which the client terminal 10 desires to acquire, receives a request message from the location server 30 instructing it to calculate location information. In response, the target terminal 60 determines if it will approve the request using an ID of the client terminal 10 included in the request message. The target terminal 60 has an approval/denial authorization for the location information request message. The target terminal 60, if it approves the request, performs positioning to calculate its location information together with the location server 30. Because various existing methods can be used for a detailed positioning process, a detailed description of the positioning process will be omitted herein.

In the following description, the above-described embodiments of the present invention will be separately described. Particularly, a description will be separately made below as to how to carry location request and location information using messages used in the SIP protocol, i.e., SIP messages.

There are several possible methods for requesting location information and receiving the location information provided in response thereto, and a description of an embodiment of the present invention will be separately made for scenarios in which a SIP SUBSCRIBE message and a SIP NOTIFY message are used, and another scenario in which a SIP MESSAGE is used. The SIP SUBSCRIBE message, SIP NOTIFY message, and SIP MESSAGE can be used whenever delivery of data such as location information is needed, regardless of whether a SIP session is established. Herein, "SIP MESSAGE", written in capital letters, is one of the SIP messages.

Figure 2:
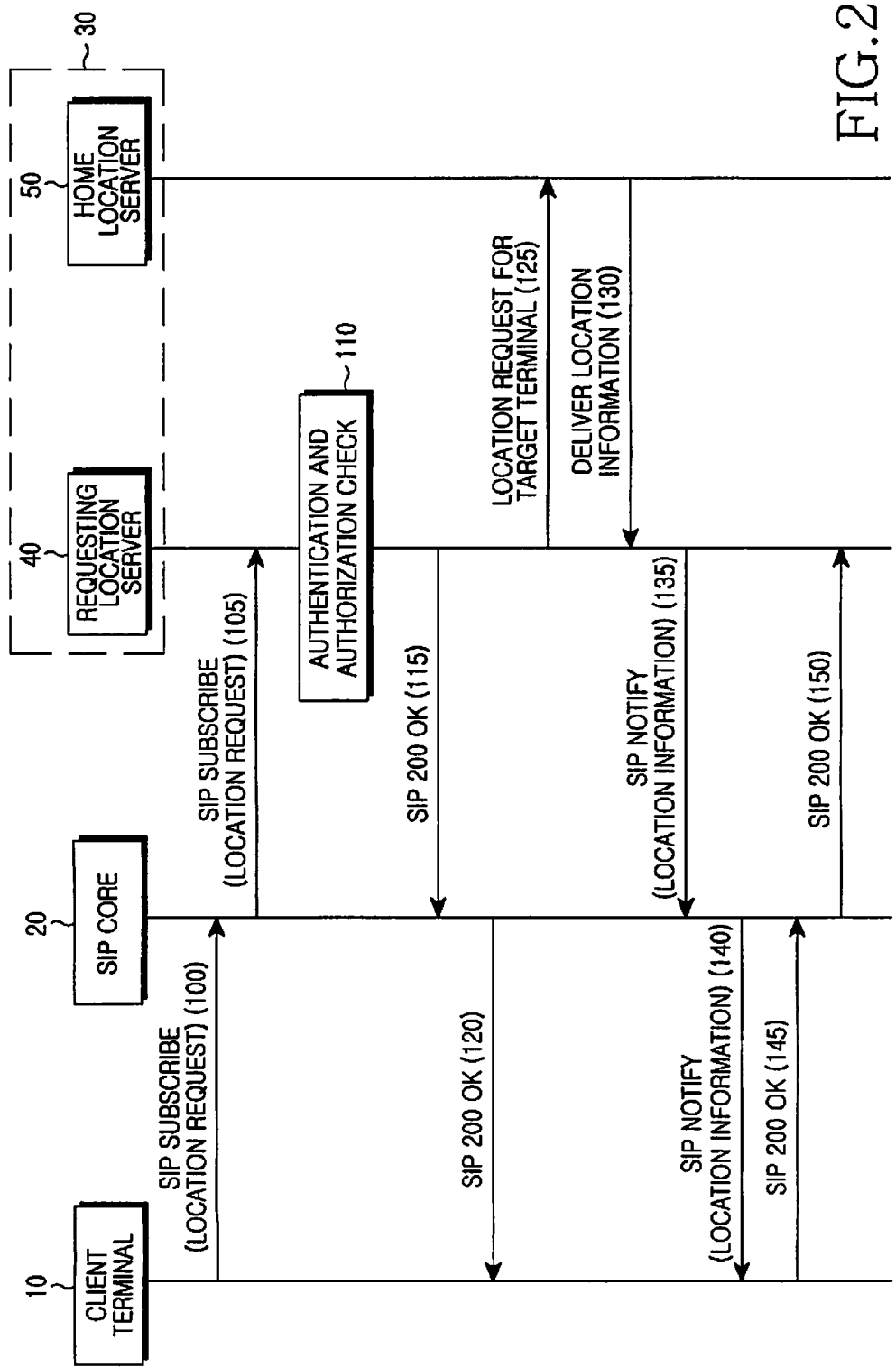
FIG. 2 is a diagram illustrating a process for acquiring location information by a client terminal according to an embodiment of the present invention.

FIG. 2 is a diagram illustrating a process for acquiring location information according to an embodiment of the present invention. More specifically, FIG. 2 illustrates a process in which a client terminal 10 sends a request for location information to a location server 30 using a SIP SUBSCRIBE, the location server 30 immediately delivers location information to the client terminal 10 using a SIP NOTIFY, or a response message, in response thereto. Although the following description is directed to an operation in a client terminal equipped with an LCS client, any entity in the network can serve as a location information requestor as long as the LCS client can be embedded therein. For example, when the LCS client is installed in a server, an operation in the client server can be the same as an operation in the client terminal. A detailed description of the client server's operation will be given below with reference to FIG. 5.

Referring to FIG. 2, the client terminal 10 sends a SIP SUBSCRIBE message including a location request to a SIP core 20 in step 100, in order to request location information of a target terminal. The SIP SUBSCRIBE message includes a location information request for a target terminal. A structure of an SIP SUBSCRIBE message is shown in Table 1 below.

TABLE 1

```
SUBSCRIBE sip:location_server@example.com SIP/2.0
Via: SIP/2.0/TCP client_terminal.example.com;
branch=z9hG4bKwYb6QREiCL
Max-Forwards: 70
To: <sip:location_server@example.com>
From: <sip:lcs_client@example.com>;tag=ie4hbb8t
Call-ID: cdB34qLToC@client_terminal.example.com
CSeq: 322723822 SUBSCRIBE
Contact: <sip:client_terminal.example.com>
Event: location
Expires: 7200
Accept: application/MLP_svc_init+xml
Content-Length: ...
<?xml version="1.0" ?>
<!DOCTYPE svc_init SYSTEM "MLP_SVC_INIT_320.DTD">
<svc_init ver="3.2.0">
<hdr ver="3.2.0">
<client>
   <id>theasp</id>
   <pwd>thepwd</pwd>
   <serviceid>0005</serviceid>
   <requestmode type="PASSIVE"/>
</client>
<subclient last_client="YES">
   <id>thelastasp</id>
   <serviceid>0005</serviceid>
</subclient>
<requestor>
   <id>theoriginalasp</id>
   <serviceid>0005</serviceid>
</requestor>
</hdr>
<slir ver="3.2.0" res_type="SYNC">
  <msids>
    <msid type="IPV4">93.10.0.250</msid>
    <msid_range>
      <start_msid>
        <msid>461018765710</msid>
      </start_msid>
      <stop_msid>
        <msid>461018765712</msid>
      </stop_msid>
    </msid_range>
    <msid type="ASID">441728922342</msid>
    <msid_range>
      <start_msid>
        <msid>461018765720</msid>
      </start_msid>
      <stop_msid>
        <msid>461018765728</msid>
      </stop_msid>
    </msid_range>
  </msids>
  <eqop>
   <resp_req type="LOW_DELAY" />
   <hor_acc>1000</hor_acc>
  </eqop>
  <geo_info>
    <CoordinateReferenceSystem>
      <Identifier>
        <code>4004</code>
        <codeSpace>EPSG</codeSpace>
        <edition>6.1</edition>
      </Identifier>
    </CoordinateReferenceSystem>
  </geo_info>
  <loc_type type="CURRENT_OR_LAST" />
  <prio type="HIGH" />
</slir>
</svc_init>
```

A requesting location server 40 will receive the SIP SUBSCRIBE message of Table 1 and thereafter, control a location information request from the client terminal 10. Therefore, a Request URI such as "location_server@example.com", which represents an ID of a requesting location server, is inserted in a header part. A call ID, such as "cdB34qLToC@client_terminal.example.com", generated by the client terminal 10, is inserted in a call ID part of the header part. "location" for indicating that the SIP SUBSCRIBE message is relevant to the location service is inserted in an Event part of the header part. Requirements for an ID and location information of a target terminal are included in a body part of the SIP SUBSCRIBE message, and Mobile Location Protocol (MLP) managed by the OMA LOC working group is preferably used for the form expressed in the body part.

Upon receipt of the SIP SUBSCRIBE message, the SIP core 20 sends the SIP SUBSCRIBE message to the requesting location server 40 in step 105. Based on a Request URI in the SIP SUBSCRIBE message, the SIP core 20 finds an entity that will receive the SIP SUBSCRIBE message. That is, the SIP core 20 identifies a corresponding requesting location server based on a requesting location server's ID in the SIP SUBSCRIBE message.

Upon receipt of the SIP SUBSCRIBE message from the SIP core 20, the requesting location server 40 authenticates the client terminal 10 and then performs authorization check in step 110. More specifically, the requesting location server 40 performs authentication to determine if the client terminal 10 is subscribed to thereto. The authentication is achieved using their previously stored authentication keys. If the authentication is successful, the requesting location server 40 sends a SIP 200 OK message indicating the successful authentication to the SIP core 20 in step 115, and the SIP core 20 forwards the SIP 200 OK message to the client terminal 10 in step 120. While sending the SIP 200 OK, the requesting location server 40 performs authorization check. The "authorization check" checks if the client terminal 10 is authorized to acquire location information of a target terminal. Although an authorization decision method in the existing location server can be used as the authorization check method, a Privacy Check Protocol (PCP) method in the OMA LOC working group can also be used.

If the client terminal 10 has the corresponding authorization, in step 125, the requesting location server 40 sends a request for location information of the target terminal to a home location server 50 in charge of calculating location information of the target terminal. Although the protocols that can be used for requesting location information are diversified according to the types of networks, it is possible to request the location information using an RLP standardized by the OMA LOC working group.

In response to the request for location information, the home location server 50 acquires location information by performing a location information calculation process with the target terminal 10, and delivers the acquired location information to the requesting location server 40 in step 130. Various existing methods can be used for the location information calculation process, and a detailed description thereof will be omitted herein for simplicity.

Although a description of the location server has been made with reference to FIG. 2 separately for the requesting location server 40 that receives a request from the client terminal 10 and the home location server 50 that processes the location information of the target terminal, the requesting location server 40 and the home location server 50 can be integrated into a single location server 30. When they are integrated into one location server 30, the client terminal 10 can directly send a request for location information to the location server 30 to which the target terminal belongs, and the location server 30 can perform both the authentication and authorization check for the client terminal 10. In such a case, requesting and delivering location information using RLP is not needed.

Upon receipt of the location information, the requesting location server 40 generates a SIP NOTIFY message as a response message to the SIP SUBSCRIBE message. During generation of the SIP NOTIFY message, the requesting location server 40 generates a SIP NOTIFY message so that the location information is included therein, and sends the SIP NOTIFY message to the SIP core 20 in step 135. Thereafter, the SIP core 20 forwards the SIP NOTIFY message to the client terminal 10 in step 140. A structure of an SIP NOTIFY message is shown in Table 2 below.

TABLE 2

NOTIFY sip:client_terminal.example.com SIP/2.0
Via: SIP/2.0/TCP
requesting_location_server.example.com;branch=z9hG4bKna998sk
From: <sip:location_server@example.com>;tag=ffd2
To: <sip:lcs_client@example.com>;tag=ie4hbb8t
Call-ID: cdB34qLToC@client_terminal.example.com
Event: location
Subscription-State: active;expires=0
Max-Forwards: 70
CSeq: 8775 NOTIFY
Contact: <sip:requesting_location_server.example.com>
Content-Type: application/MLP_svc_result+xml
Content-Length: ...
<?xml version="1.0" ?>
<!DOCTYPE svc_result SYSTEM "MLP_SVC_RESULT_320.DTD">
<svc_result ver="3.2.0">
<slia ver="3.0.0" >
 <pos>
  <msid>461011334411</msid>
  <pd>
   <time utc_off="+0200">20020623134453</time>
   <shape>
    <CircularArea srsName="www.epsg.org#4326">
     <coord>
      <X>30 16 28.308N</X>
      <Y>45 15 33.444E</Y>
     </coord>
     <radius>240</radius>
    </CircularArea>
   </shape>
  </pd>
 </pos>
 <pos>
  <msid>461018765710</msid>
  <pd>
   <time utc_off="+0300">20020623134454</time>
   <shape>
    <CircularArea srsName="www.epsg.org#4326">
     <coord>
      <X>30 12 28.296N</X>
      <Y>86 56 33.864E</Y>
     </coord>
     <radius>570</radius>
    </CircularArea>
   </shape>
  </pd>
 </pos>
 <pos>
  <msid>461018765711</msid>
  <pd>
   <time utc_off="+0300">20020623110205</time>
   <shape>
    <CircularArea srsName="www.epsg.org#4326">
     <coord>
      <X>78 12 34.308N</X>
      <Y>76 22 2.82E</Y>
     </coord>
     <radius>15</radius>
    </CircularArea>
   </shape>
  </pd>
 </pos>
 <pos>
  <msid>461018765712</msid>
  <poserr>
   <result resid="10">QOP NOT ATTAINABLE</result>

TABLE 2-continued

<time>20020623134454</time>
  </poserr>
 </pos>
</slia>
</svc_result>

A client terminal 10 that requested the location information will receive the SIP NOTIFY message of Table 2. Therefore, a Request URI such as "client_terminal.example.com", which represents an ID of the client terminal 10, is inserted in a header part. A call ID, where the same call ID as "cdB34qLToC@client_terminal.example.com" is set in order to indicate that the SIP NOTIFY message corresponds with the SIP SUBSCRIBE message sent by the client terminal 10, is inserted in a call ID part of the header part. As stated in connection with Table 1, "location" used to indicate that the SIP NOTIFY message is also relevant to the location service is inserted in an Event part of the header part. Particularly, "application/MLP_svc_result+xml" inserted in a Content-Type part of the header part indicates that location information is included in the SIP NOTIFY message in the xml form. Therefore, the client terminal 10 can acquire location information in the SIP NOTIFY message by checking a body part of the SIP NOTIFY message.

When the client terminal 10 requests location information of multiple target terminals, one SIP NOTIFY message can include the location information of the multiple target terminals. In Table 2, for example, "<pos>~</pos>" is inserted three times, showing that location information of 3 target terminals is inserted. Of course, when location information associated with a corresponding target terminal is calculated on a one-by-one basis, the location server 30 can deliver the SIP NOTIFY message whenever the location information is calculated.

After receiving the SIP NOTIFY message, the client terminal 10 sends a SIP 200 OK message to the requesting location server 40 via the SIP core 20, in response to the received SIP NOTIFY, in steps 145 and 150. A structure of the SIP 200 OK message is shown in Table 3 below.

TABLE 3

SIP/2.0 200 OK
Via: SIP/2.0/TCP requesting_location_server.-
example.com;branch=z9hG4bKna998sk;received=192.0.2.2
From: <sip:location_server@example.com>;tag=ffd2
To: <sip:lcs_client@example.com>;tag=xfg9
Call-ID: 2010@client_terminal.example.com
CSeq: 8775 NOTIFY
Content-Length: 0

When a SIP SUBSCRIBE message and a SIP NOTIFY message are exchanged in a pair as stated above, the location server, after receiving the SIP SUBSCRIBE message, immediately sends the SIP NOTIFY message in response thereto, so that location information is provided to the client terminal. After sending the SIP SUBSCRIBE message, the client terminal waits for a SIP NOTIFY message to be received, using a timer. If the SIP NOTIFY message is not received within a predetermined time, it is preferable that the client terminal performs error processing.

As described above, the client terminal can immediately receive one SIP NOTIFY message in response to one delivery of a SIP SUBSCRIBE message. However, the client terminal can be provided with the location information at a required time. For this purpose, the client terminal may provide the location server with a condition for receiving location information, when requesting the location information.

Figure 3A:
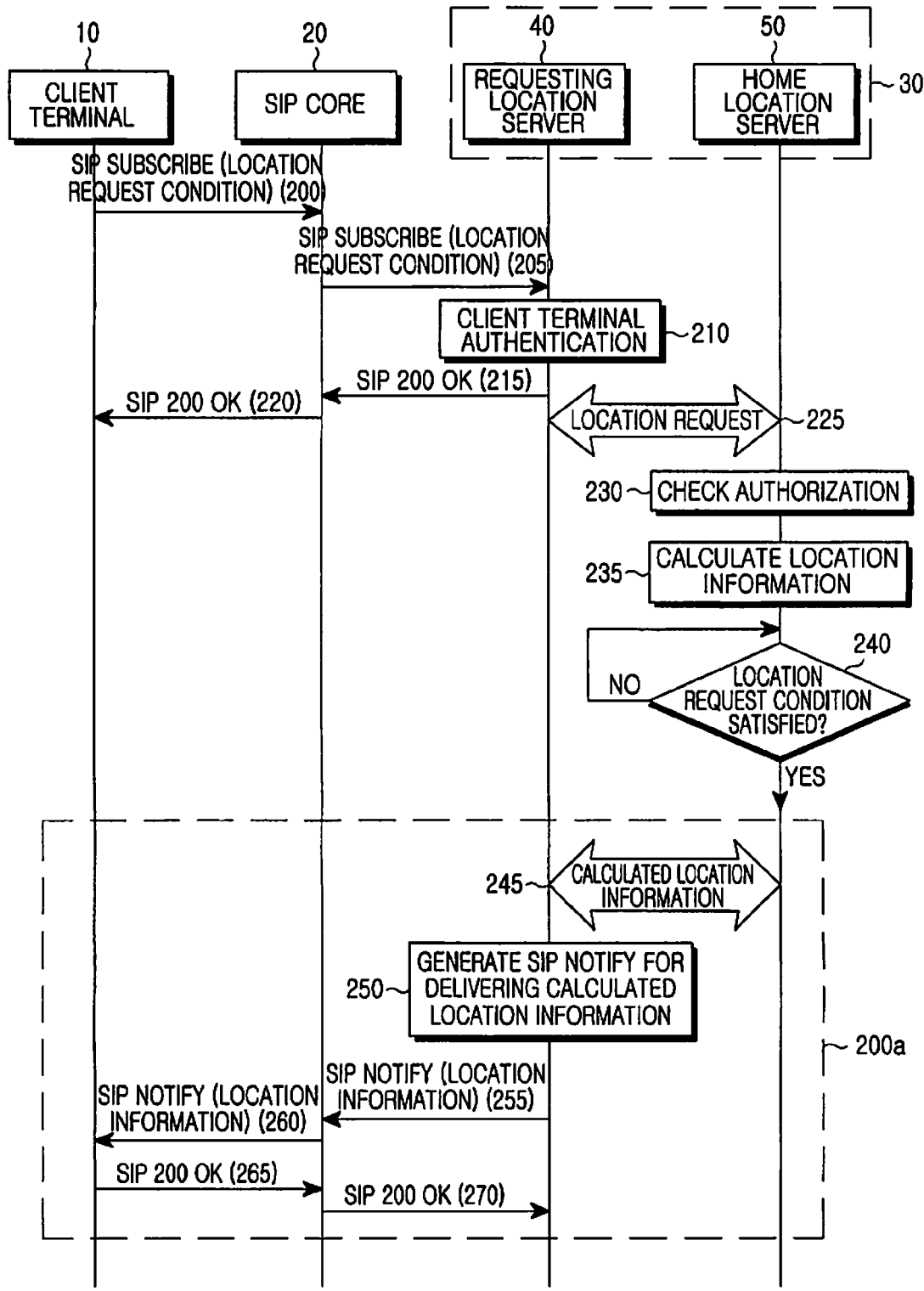
FIGS. 3A and 3B are diagrams illustrating a process for acquiring location information based on location request conditions according to an embodiment of the present invention.
Figure 3B:
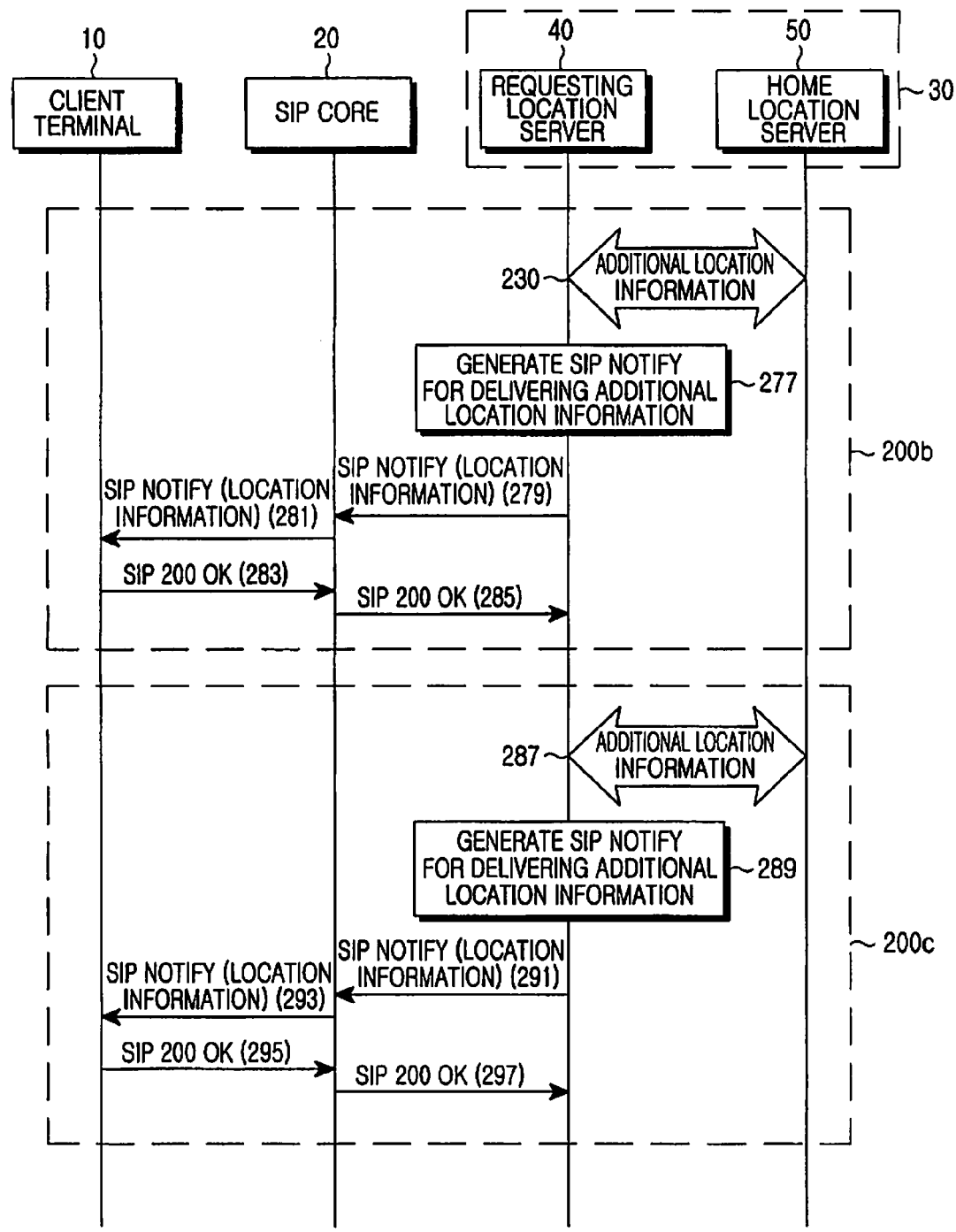

FIGS. 3A and 3B are diagrams illustrating a process of acquiring location information based on a location request condition according to an embodiment of the present invention.

Referring to FIG. 3A, in step 200, a client terminal 10 includes a location request condition in a SIP SUBSCRIBE message and sends it to a SIP core 20 to request location information of a target terminal. In step 205, the SIP core 20 forwards the SIP SUBSCRIBE message with the location request condition to a requesting location server 40. The "location request condition" as used herein is a report condition, and can include, for example, the number of location information reports (one or more than one reports), a report interval (e.g., report is made every hour), etc. Although only the most basic conditions are presented herein for the location request, various other conditions and location request-relation information can be included in a SIP SUBSCRIBE message. A structure of a SIP SUBSCRIBE message in which such location request conditions are included is shown below in Table 4.

TABLE 4

```
SUBSCRIBE sip:location_server@example.com SIP/2.0
Via: SIP/2.0/TCP client_terminal.example.com;
branch=z9hG4bKwYb6QREiCL
Max-Forwards: 70
To: <sip:location_server@example.com>
From: <sip:lcs_client@example.com>;tag=ie4hbb8t
Call-ID: cdB34qLToC@client_terminal.example.com
CSeq: 322723822 SUBSCRIBE
Contact: <sip:client_terminal.example.com>
Event: location
Expires: 7200
Accept: application/MLP_svc_init+xml
Content-Length: ...
<?xml version="1.0" ?>
<!DOCTYPE svc_init SYSTEM "MLP_SVC_INIT_320.DTD">
<svc_init ver="3.2.0">
<hdr ver="3.2.0">
  <client>
    <id>theasp</id>
    <pwd>thepwd</pwd>
    <serviceid>0005</serviceid>
    <requestmode type="PASSIVE"/>
  </client>
  <subclient last_client="YES">
    <id>thelastasp</id>
    <serviceid>0005</serviceid>
  </subclient>
  <requestor>
    <id>theoriginalasp</id>
    <serviceid>0005</serviceid>
  </requestor>
</hdr>
<slir ver="3.2.0" res_type="SYNC">
  <msids>
    <msid type="IPV4">93.10.0.250</msid>
    <msid_range>
      <start_msid>
        <msid>461018765710</msid>
      </start_msid>
      <stop_msid>
        <msid>461018765712</msid>
      </stop_msid>
    </msid_range>
    <msid type="ASID">441728922342</msid>
    <msid_range>
      <start_msid>
        <msid>461018765720</msid>
      </start_msid>
      <stop_msid>
        <msid>461018765728</msid>
      </stop_msid>
```

TABLE 4-continued

```
    </msid_range>
  </msids>
  <interval>000030000</interval>
  <start-time utc-off = "+0300">20021003112700</start-time>
  <stop-time utc-off = "+0300">20021003112700</stop-time>
    <eqop>
      <resp_req type="LOW_DELAY" >
      <hor_acc>1000</hor_acc>
    </eqop>
    <geo_info>
      <CoordinateReferenceSystem>
        <Identifier>
          <code>4004</code>
          <codeSpace>EPSG</codeSpace>
          <edition>6.1</edition>
        </Identifier>
      </CoordinateReferenceSystem>
    </geo_info>
    <loc_type type="CURRENT_OR_LAST" />
    <prio type="HIGH" />
  </slir>
</svc_init>
```

The SIP SUBSCRIBE message shown in Table 4 has a structure similar to that of the SIP SUBSCRIBE message shown in Table 2, but, as indicted above, the SIP SUBSCRIBE message of Table 4 further includes the location request condition. In Table 4, a report interval is set as one of the location request conditions. In addition, it is possible to set various conditions, such as not only the time, but also the place, at which the client terminal 10 desires to receive location information.

Upon receipt of the SIP SUBSCRIBE message, the requesting location server 40 authenticates the client terminal 10 in step 210, and sends a SIP 200 OK message indicating success in the authentication to the client terminal 10 via the SIP core 20 through steps 215 and 220. Thereafter, in step 225, the requesting location server 40 sends a location request to a home location server 50. Preferably, the requesting location server 40 sends a location request to a home location server in charge of calculating location information of a target terminal using RLP standardized by the OMA LOC working group. In addition to the RLP, various other methods can be used as the location request method according to the types of networks.

In step 230, the home location server 50 determines if the client terminal 10 is authorized to acquire location information of a target terminal. Though the authorization decision method in the existing location server is available, the home location server 50 can use a PCP method used in the OMA LOC working group. If it is determined that the client terminal 10 is authorized, the home location server 50 starts calculating location information of the target terminal in step 235. Although FIG. 3A illustrates a scenario in which the requesting location server 40 authenticates the client terminal 10 and the home location server 50 performs authorization check, the home location server 50 can perform both authentication and authorization check. When the target terminal belongs to a subscription group of the requesting location server 40, the requesting location server 40 can perform both authentication and authorization check as illustrated in FIG. 2.

If the client terminal 10 has the authorization, the home location server 50 calculates location information of the target terminal in step 235. Before transmitting the calculated location information to the client terminal 10, in step 240, the home location server 50 determines if the location request condition is satisfied. That is, the home location server 50 checks the location request condition previously provided from the requesting location server 40 during its location request. If the location request condition is satisfied, the home location server 50 delivers the calculated location information to the requesting location server 40 in step 245. The requesting location server 40 generates a SIP NOTIFY message for delivering the calculated location information in step 250. The generated SIP NOTIFY message includes location information. In step 255, the requesting location server 40 sends the SIP NOTIFY message to the SIP core 20, and the SIP core 20 forwards it to the client terminal 10 in step 260. In response to the received SIP NOTIFY message, the client terminal 10 sends a SIP 200 OK message indicating its normal receipt of the SIP NOTIFY message, to the requesting location server 40 via the SIP core 20 through steps 265 and 270.

Although the description of FIG. 3A has been made in which the requesting location server 40 provides a location request condition to the home location server 50, and the home location server 50 determines if the location request condition is satisfied, the same is possible even for when the calculated location information is provided from the home location server 50, and the requesting location server 40 determines if the location request condition is satisfied. When the location servers are implemented into one location server 30 and the client terminal 10 wants to receive a report on location information, the location server 30 generates a SIP NOTIFY message including the calculated location information and sends it to the client terminal 10. That is, the client terminal 10 suggests a particular condition corresponding to the report to the location server 30, thereby requesting the location server 30 to send a report when the particular condition has occurred. Because the location server 30 sends the SIP NOTIFY message to the client terminal 10 when the particular condition has occurred, the client terminal 10 may intermittently receive the location information. For example, when the client terminal 10 requests a report on the location information of the target terminal at regular intervals, the home location server 50 also sends a SIP NOTIFY message with the calculated location information at regular intervals. As a result, the client terminal 10 can receive the location information report several times.

FIG. 3B illustrates a scenario in which location information is additionally delivered according to the condition set by the client terminal 10. Steps 275 to 285 and steps 287 to 297 in FIG. 3B are the same as steps 245 to 270 in FIG. 3A. FIGS. 3A and 3B illustrate that location information is provided 3 times as shown by reference numerals 200*a*, 200*b*, and 200*c*. When the requesting location server 40 additionally delivers location information of the target terminal according to the location request condition after a lapse of a time in this way, the home location server 50 delivers the location information to the requesting location server 40 using RLP. When finally transmitting the location information of the target terminal, the requesting location server 40 sets, in a SIP NOTIFY message, information indicating that the location information is the last one. Accordingly, the requesting location server 40 sets an Expire field of a header part in the SIP NOTIFY message to '0' before sending it.

With one location information request, the client terminal can receive several location information reports not only for one target terminal but also for multiple target terminals. For this purpose, when the client terminal sends a request for location information of multiple target terminals to the location server, with one location information request, i.e., with one transmission of a SIP SUBSCRIBE message, the location server calculates location information of the multiple target terminals. In this case, because the location server should perform a location information calculation process with each target terminal individually, the time the location server acquires location information is different for each target terminal. Thus, the location server delivers corresponding location information to the client terminal using a SIP NOTIFY message every time it acquires location information of each target terminal. In this case, the client terminal can receive the SIP NOTIFY message several times.

Alternatively, the location server can gather location information of each target terminal and include it in one SIP NOTIFY message, thereby providing location information of all target terminals at one time. A structure of the SIP NOTIFY message for such a case is shown in Table 5.

TABLE 5

NOTIFY sip:client_terminal.example.com SIP/2.0
Via: SIP/2.0/TCP requesting_location_server.example.com;
branch=z9hG4bKna998sk
From: <sip:location_server@example.com>;tag=ffd2
To: <sip:lcs_client@example.com>;tag=ie4hbb8t
Call-ID: cdB34qLToC@client_terminal.example.com
Event: location
Subscription-State: active;expires=0
Max-Forwards: 70
CSeq: 8775 NOTIFY
Contact: <sip:requesting_location_server.example.com>
Content-Type: application/MLP_svc_result+xml
Content-Length: ...
<?xml version="1.0" ?>
<!DOCTYPE svc_result SYSTEM "MLP_SVC_RESULT_320.DTD">
<svc_result ver="3.2.0">
<slia ver="3.0.0" >
  <pos>
    <msid>461011334411</msid>
    <pd>
      <time utc_off="+0200">20020623134453</time>
      <shape>
        <CircularArea srsName="www.epsg.org#4326">
          <coord>
            <X>30 16 28.308N</X>
            <Y>45 15 33.444E</Y>
          </coord>
          <radius>240</radius>
        </CircularArea>
      </shape>
    </pd>
  </pos>
  <pos>
    <msid>461018765710</msid>
    <pd>
      <time utc_off="+0300">20020623134454</time>
      <shape>
        <CircularArea srsName="www.epsg.org#4326">
          <coord>
            <X>30 12 28.296N</X>
            <Y>86 56 33.864E</Y>
          </coord>
          <radius>570</radius>
        </CircularArea>
      </shape>
    </pd>
  </pos>
  <pos>
    <msid>461018765711</msid>
    <pd>
      <time utc_off="+0300">20020623110205</time>
      <shape>
        <CircularArea srsName="www.epsg.org#4326">
          <coord>
            <X>78 12 34.308N</X>
            <Y>76 22 2.82E</Y>
          </coord>
          <radius>15</radius>
        </CircularArea>
      </shape>
    </pd>
  </pos>

TABLE 5-continued

```
<pos>
  <msid>461018765712</msid>
  <poserr>
    <result resid="10">QOP NOT ATTAINABLE</result>
    <time>20020623134454</time>
  </poserr>
</pos>
</slia>
</svc_result>
```

The SIP NOTIFY message shown in Table 5 is similar in structure to the SIP NOTIFY message shown in Table 2. In Table 5, "<pos>~</pos>" is inserted three times, showing that location information of 3 target terminals is inserted. When the SIP NOTIFY message of Table 5 is used, the client terminal 10 can iteratively acquire location information of multiple target terminals.

Aside from the above-described SIP SUBSCRIBE message and SIP NOTIFY message, a SIP MESSAGE used for data delivery can be used.

Figure 4:
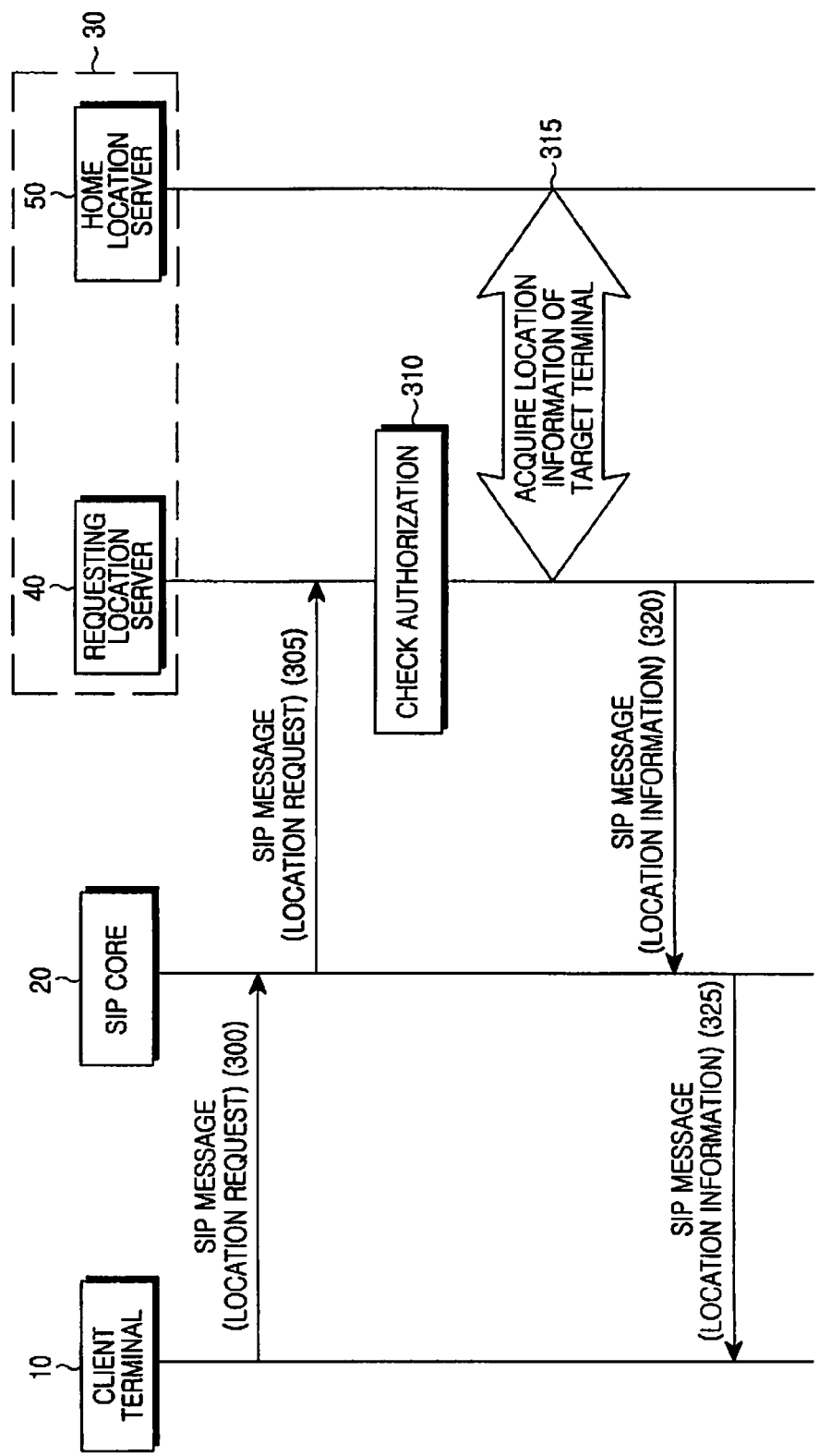
FIG. 4 is a diagram illustrating a process for acquiring location information according to an embodiment of the present invention.

FIG. 4 is a diagram illustrating a process for immediately acquiring location information according to an embodiment of the present invention, in which a SIP MESSAGE is used.

Referring to FIG. 4, when a client terminal 10 sends a SIP MESSAGE with a location request to a SIP core 20 in step 300, the SIP core 20 forwards the SIP MESSAGE to a requesting location server 40 in step 305. The SIP MESSAGE is used for delivering information on a sender to the other party one-sidedly. That is, the sender provides its own information without receiving a request to send the information from the exterior. The location request is added to a body part of the SIP MESSAGE, a structure of which is shown below in Table 6.

TABLE 6

```
MESSAGE sip:requesting-location server@example.com SIP/2.0
Via: SIP/2.0/UDP terminal a.example.com;branch=z9hG4bKnashds8
Max-Forwards: 70
To: requesting location server <sip: requesting location
server@example.com>
From: terminal A <sip:ue1@example.com>;tag=1928301774
Call-ID: a84b4c76e66710
CSeq: 314159 MESSAGE
Content-Type: application/ xml
Content-Length:256
<?xml version="1.0" ?>
<!DOCTYPE svc_init SYSTEM "MLP_SVC_INIT_320.DTD">
<svc_init ver="3.2.0">
  <hdr ver="3.2.0">
    <client>
      <id>theasp</id>
      <pwd>thepwd</pwd>
      <serviceid>0005</serviceid>
      <requestmode type="PASSIVE"/>
    </client>
    <requestor>
      <id>theoriginalasp</id>
      <serviceid>0005</serviceid>
    </requestor>
  </hdr>
  <slir ver="3.2.0" res_type="SYNC">
    <msids>
      <msid type="IPV4">93.10.0.250</msid>
      <msid_range>
        <start_msid>
          <msid>461018765710</msid>
        </start_msid>
        <stop_msid>
          <msid>461018765712</msid>
        </stop_msid>
      </msid_range>
      <msid type="ASID">441728922342</msid>
```

TABLE 6-continued

```
      <msid_range>
        <start_msid>
          <msid>461018765720</msid>
        </start_msid>
        <stop_msid>
          <msid>461018765728</msid>
        </stop_msid>
      </msid_range>
    </msids>
    <eqop>
      <resp_req type="LOW_DELAY" />
      <hor_acc>1000</hor_acc>
    </eqop>
    <geo_info>
      <CoordinateReferenceSystem>
        <Identifier>
          <code>4004</code>
          <codeSpace>EPSG</codeSpace>
          <edition>6.1</edition>
        </Identifier>
      </CoordinateReferenceSystem>
    </geo_info>
    <loc_type type="CURRENT_OR_LAST" />
    <prio type="HIGH" />
  </slir>
</svc_init>
```

In Table 6, "requesting-location server@example.com", a URI of the requesting location server, represents the other party that will receive the SIP MESSAGE. Further, "Content-Type: application/xml" indicates that the content requesting location information of a target terminal is inserted in the xml form. For example, in Table 6, a standard location immediate request of Open Mobile Alliance Mobile Location Protocol (OMA MLP), expressed in xml, can be used. The content requesting location information of a target terminal, expressed in text or Session Description Protocol (SDP) other than xml, can also be included. In addition, a part starting with "<client>" represents an identity of a client terminal that has requested the location information, and a part starting with "<msids>" represents an identity of a target terminal, the location information of which the client terminal desires to get.

A requesting location server 40, which has received the SIP MESSAGE, performs authentication and authorization check in the above-described manner in step 310, and performs a process of acquiring location information of a target terminal, with a home location server 50 to which the target terminal belongs in step 315. The location information acquisition process can be carried out in various manners as described above.

In step 320, the requesting location server 40 includes the acquired location information in a SIP MESSAGE, and sends the SIP MESSAGE to the SIP core 20. Upon receiving the SIP MESSAGE from the SIP core 20 in step 325, the client terminal 10 can acquire location information included in a body part of the received SIP MESSAGE. The SIP MESSAGE can also be delivered to another terminal designated by the client terminal. A structure of the SIP MESSAGE for this case is shown in Table 7 below.

TABLE 7

```
MESSAGE sip:terminal a @example.com SIP/2.0
Via: SIP/2.0/UDP requesting location
server.example.com;branch=z9hG4bKnashds8
Max-Forwards: 70
To: terminal a <sip:terminal a@example.com>
From: requesting location server<sip:r-ls@example.com>;tag=1928301774
Call-ID: a84b4c76e66710
```

TABLE 7-continued

```
CSeq: 314159 MESSAGE
Content-Type:xml
Content-Length:256
<pos>
    <msid>caller@example.com</msid>
    <pd>
        <time>20020813010423</time>
        <shape>
            <CircularArea srsName="www.epsg.org#4326">
                <coord>
                    <X>30 45 35.41N</X>
                    <Y>45 32 55.02E</Y>
                </coord>
                <radius>15</radius>
            </CircularArea>
        </shape>
    </pd>
</pos>
```

In Table 7, "terminal a @example.com" represents a URI of the other party's terminal 'a' that will receive the SIP MESSAGE. Based on the URI of the other party's terminal 'a', it is possible to find out a target to which the SIP MESSAGE will be transmitted. By using the SIP MESSAGE, the client terminal 10 can designate the other party, the location information of which another terminal will receive.

By combining the SIP MESSAGE with the location service in this way, it is possible to apply it to a report service in which a target terminal calculates its own location information and delivers it to the other party that wants the location information. Accordingly, the client terminal 10, when it uses the SIP MESSAGE, can request location information of the target terminal, and also can deliver its own location information. In this case, no SIP session has been established between the two terminals. For example, on the assumption that there are two terminals that employ an interactive voice service using the SIP protocol and one of the terminals desires to deliver its own location information to the other party, the other party can receive the location information during its call, so that it can find out a location of its counterpart terminal in conversation, thus experiencing a realistic interactive voice service. Further, when the location service is applied to the SIP-based multimedia service, it is possible to, for example, take a picture and provide location information of the picture, as well. As a result, the user can receive the location information while enjoying the multimedia service such as the voice call, thereby providing a highly enhanced service.

Figure 5:
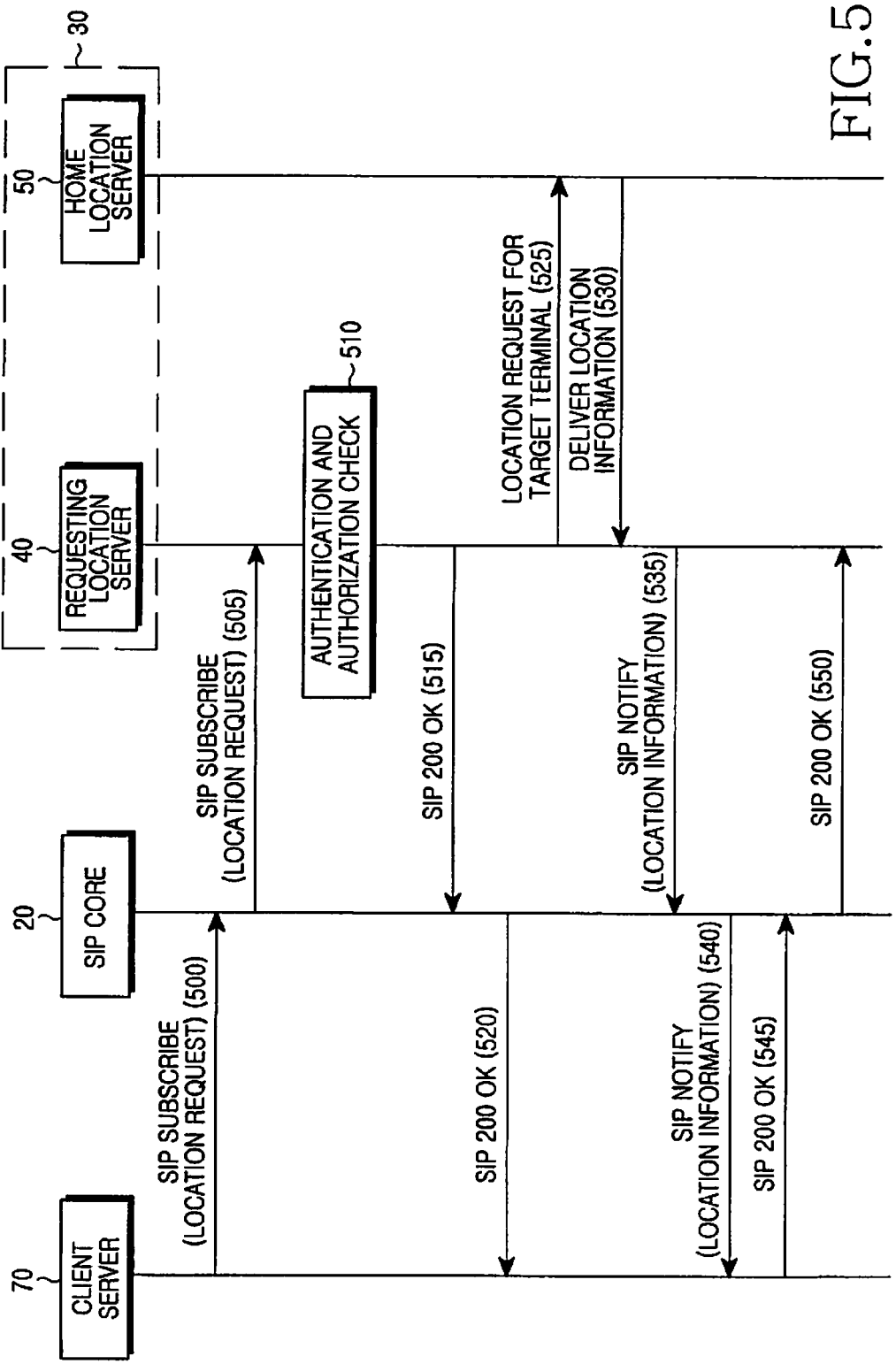
FIG. 5 is a diagram illustrating a process for acquiring location information by a client server according to an embodiment of the present invention.

FIG. 5 illustrates a process in which when a client server 70 sends a request for location information to a location server 30 using a SIP SUBSCRIBE message, a location server 30 immediately delivers location information to the client server 70 using a SIP NOTIFY message, or response message, in response to the request. The client server 70 in FIG. 5 can include a SIP application server. However, when the SIP application server is separately implemented, the location information system can be realized such that when a client terminal sends a location request to the SIP application server, the location information is delivered to a location server 30 via a SIP core 20.

Although FIG. 5 illustrates a process in which the client server 70 sends a request for location information to the location server 30 via the SIP core 20, and acquires the location information in response to the request, the client server 70 of FIG. 5 can be replaced with a SIP application server because the client server 70 can include the SIP application server. The client server 70 is equal in operation to the client terminal 10 because it corresponds to a part requesting a location, like in the client terminal 10. Thus, steps 500 to 550 of FIG. 5 are to the same as steps 100 to 150 of FIG. 2, but the entity requesting location information is the client server 70 rather than the client terminal 10.

While embodiments of the present invention have been described so far as utilizing the SIP SUBSCRIBE message, SIP NOTIFY message, and SIP MESSAGE as SIP messages for data delivery between the client and the target terminal, a Message Session Relay Protocol (MSRP) protocol used for data exchange between the client and the target terminal can also be used as an alternative. Regarding such a client, in addition to the terminal and the server, all entities in the network, in which the LCS client can be embedded, can serve as the client.

Figure 6:
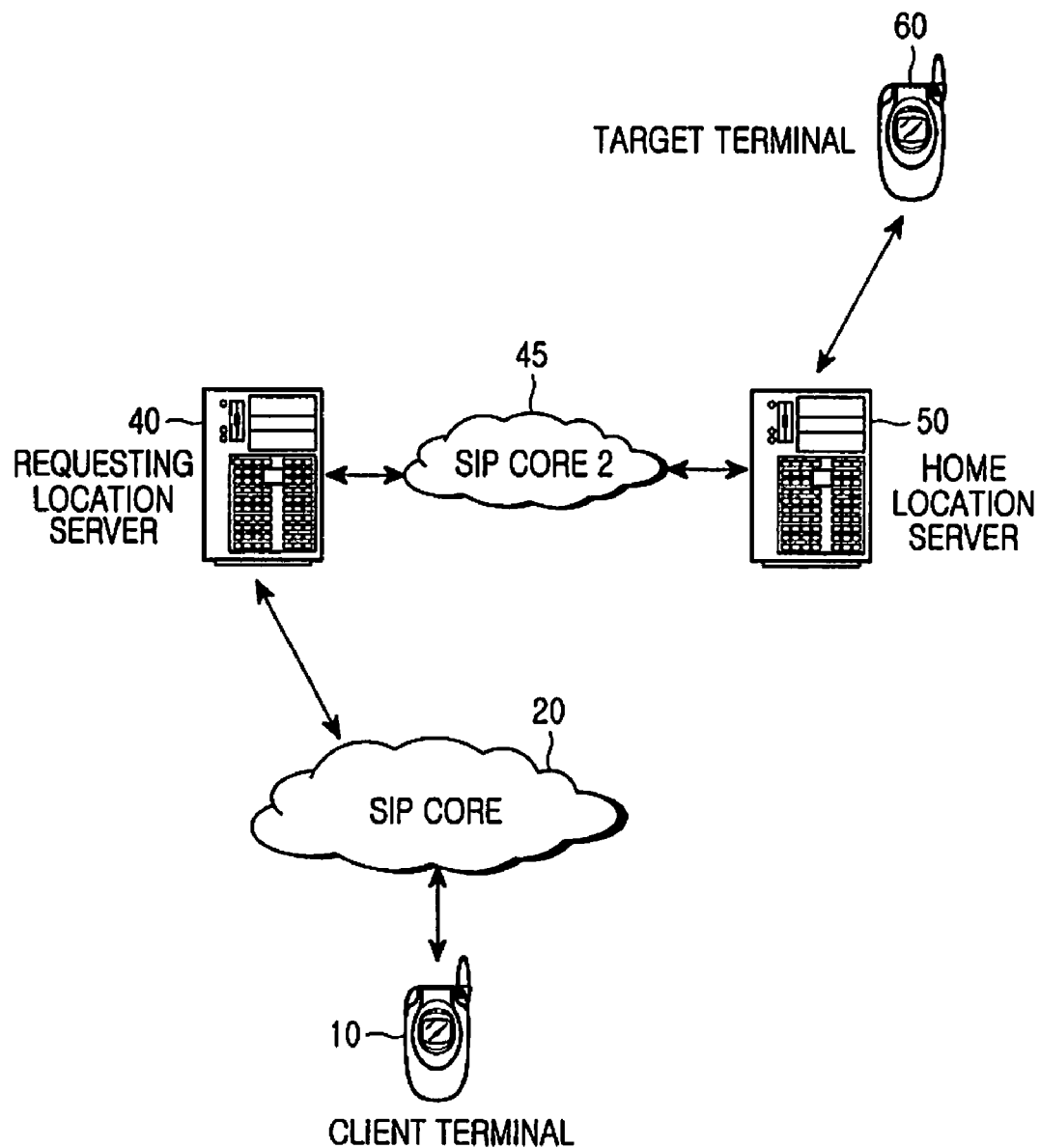
FIG. 6 is a diagram illustrating a system for providing location information according to an embodiment of the present invention.

FIG. 6 illustrates an example in which a requesting location server 40 and a home location server 50 communicate with each other through a SIP core #2 45 as they are separately implemented. A client terminal 10 exchanges messages with the requesting location server 40 via a SIP core 20, and the requesting location server 40 and the home location server 50 exchange messages with each other by way of the SIP core #2 45. To request a location of a target terminal, the client terminal 10 sends a location request message to the requesting location server 40 via the SIP core 20. According to an embodiment of the present invention, the client terminal 10 can include, in the location request message, the information indicating the other party's terminal to which it will send the message. Although one target terminal 60 is illustrated in FIG. 6, when the client terminal 10 designates multiple target terminals to which it will send the location request message, multiple home location servers and their associated target terminals can exist in pairs.

Figure 7:
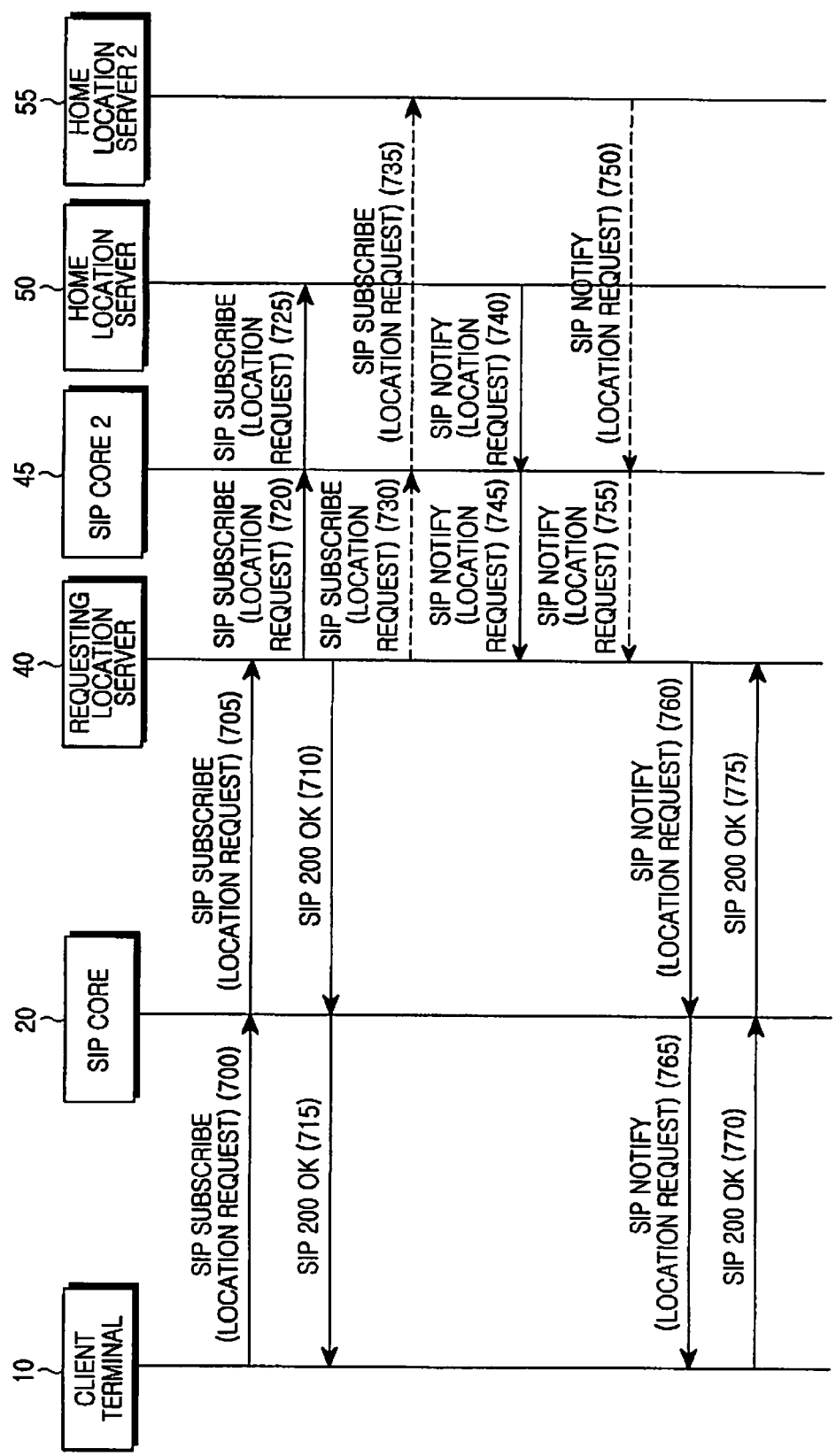
FIG. 7 is a diagram illustrating a process for acquiring location information of a target terminal according to an embodiment of the present invention.

FIG. 7 is a diagram illustrating a process for acquiring location information of a target terminal according to an embodiment of the present invention.

Referring to FIG. 7, in steps 700 and 705, a client terminal 10, which uses a SIP SUBSCRIBE message as a location request message, sends the SIP SUBSCRIBE message to a requesting location server 40 via a SIP core 20. A structure of the SIP SUBSCRIBE message is shown in Table 8.

TABLE 8

SUBSCRIBE sip:target terminal ID @example.com SIP/2.0
Via: SIP/2.0/TCP client_terminal.example.com;
branch=z9hG4bKwYb6QREiCL
Max-Forwards: 70
To: <sip:location_server@example.com>
From: <sip:lcs_client@example.com>;tag=ie4hbb8t
Call-ID: cdB34qLToC@client_terminal.example.com
CSeq: 322723822 SUBSCRIBE
Contact: <sip:client_terminal.example.com>
Event: location
Expires: 7200
Accept: application/MLP_svc_init+xml
Content-Length: ...

In Table 8, an ID of a target terminal is inserted as a Request URI of a SIP SUBSCRIBE, or location request message, to designate the other party's terminal. Because the client terminal 10 and the requesting location server 40 exchange messages based on SIP, the ID of the target terminal is inserted into the location request message in the SIP URI form. When "event" is set as "location", the SIP core 20 sends the SIP SUBSCRIBE message to the requesting location server 40 unconditionally, without the need to detect a use of the SIP SUBSCRIBE message. When such setting is given, Table 1 provides that requirements for an ID and location information of the target terminal are inserted in a body part of the SIP SUBSCRIBE message, whereas Table 8 does not need the body part because the target terminal is directly designated in the header part.

Upon receipt of the SIP SUBSCRIBE message, the requesting location server 40 performs authentication and authorization check on the client terminal 10. Thereafter, in steps 710 and 751, the requesting location server 40 sends a SIP 200 OK message indicating success in the authentication for the location request, to the client terminal 10 via the SIP core 20. Also, upon receipt of the SIP SUBSCRIBE message, the requesting location server 40 determines a target terminal to which it will forward the SIP SUBSCRIBE message, depending on a target ID specified in a header part of the SIP SUBSCRIBE message. When the requesting location server 40 determines the target terminal in this manner, a home location server managing the determined target terminal can also get the information. Thus, in steps 720 and 725, the requesting location server 40 forwards the SIP SUBSCRIBE message to a home location server 50 managing the target terminal, via a SIP core #2 45.

If multiple target terminals are designated by the client terminal 10, the requesting location server 40 should forward the SIP SUBSCRIBE message even to the home location server managing the designated target terminal. FIG. 7 illustrates a process of requesting location information when two target terminals are designated. Accordingly, in steps 730 and 735, the requesting location server 40 forwards the SIP SUBSCRIBE message even to a home location server #2 55 managing the other target terminal, via the SIP core #2 45. In response, the home location server 50 and the home location server #2 55 perform a location calculation process with their associated target terminals, thereby acquiring location information. In steps 740 to 755, the home location server 50 and the home location server #2 55, which have acquired the location information, send a SIP NOTIFY message, or location response message, to the requesting location server 40 via the SIP core #2 45. Thereafter, steps 760 to 775 of FIG. 7 are achieved as in steps 135 to 150 of FIG. 2.

Figure 8:
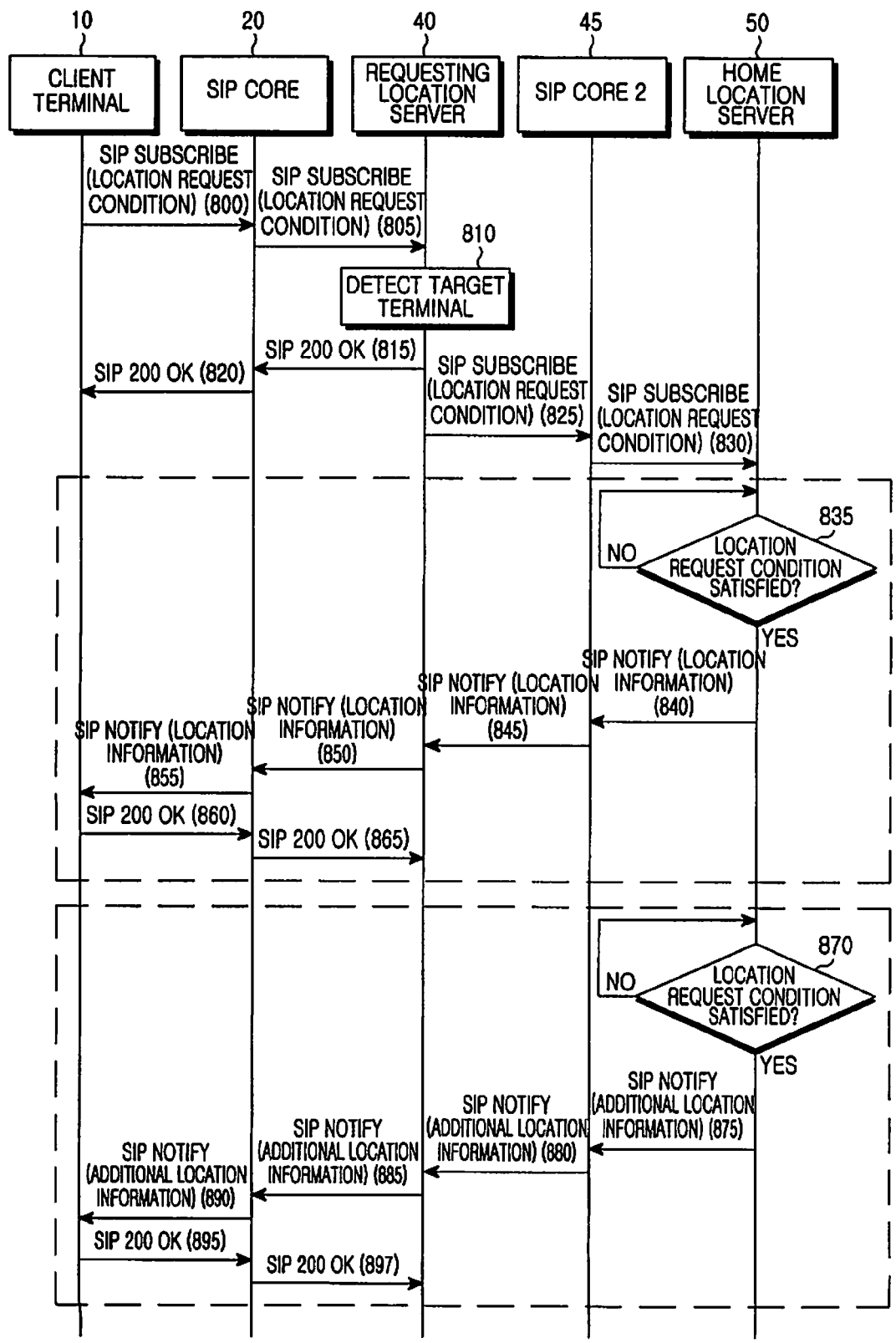
FIG. 8 is a diagram illustrating a process for acquiring location information of a target terminal based on location request conditions according to an embodiment of the present invention.

FIG. 8 is a diagram illustrating a process for acquiring location information of a target terminal based on location request conditions according to an embodiment of the present invention.

Referring to FIG. 8, a client terminal 10 sends a SIP SUBSCRIBE message to a requesting location server 40 via a SIP core 20 in steps 800 and 805. The SIP SUBSCRIBE message includes a location request condition designated by the client terminal 10. The location request condition has been described in connection with FIG. 3A. However, the SIP SUBSCRIBE message with the location request condition has a structure where an ID of a target terminal is inserted in a header of the SIP SUBSCRIBE message in the SIP URI form and the location request condition is inserted in a body part. When there are several target terminals, location information of which the client terminal 10 desires to acquire, a group URI indicating multiple target terminals is inserted, instead of an ID of one target terminal.

The SIP SUBSCRIBE message is directly delivered to the requesting location server 40 because "location" is set as "event" as in FIG. 7. Accordingly, after authenticating the client terminal 10, the requesting location server 40 detects a target terminal by analyzing the received SIP SUBSCRIBE message in step 810. That is, the requesting location server 40 determines to which target terminal it will send the SIP SUBSCRIBE message. For this purpose, based on a target terminal's ID inserted in the SIP SUBSCRIBE message, the requesting location server 40 identifies a target terminal having the ID. If a group URI is inserted in the SIP SUBSCRIBE message, the requesting location server 40 searches a separate database for target terminal IDs corresponding to the group. Accordingly, the requesting location server 40 can detect target terminals corresponding to the searched target terminal IDs. In steps 825 and 830, the requesting location server 40 forwards the SIP SUBSCRIBE message to a home location server 50 where the detected target terminals are located, via a SIP core #2 45. In FIG. 8, because the location request is sent to one target terminal, only one home location server is shown.

The home location server 50, which has received the SIP SUBSCRIBE message with the location request condition, acquires the location information by performing a location calculation process with the target terminal belonging thereto. Thereafter, in step 835, the home location server 50 determines if the location request condition is satisfied. When the location request condition is satisfied, the home location server 50 delivers the location information to the requesting location server 40 via the SIP core #2 45 using a SIP NOTIFY message in steps 840 and 845. Also, the requesting location server 40 delivers the location information to the client terminal 10 via the SIP core 20 using a SIP NOTIFY message in steps 850 and 855. In steps 860 and 865, the requesting location server 40 receives a SIP 200 OK message from the client terminal 10 via the SIP core 20 in response to the SIP NOTIFY message, thereby determining that the location information has been normally delivered.

When the location request condition is set as iterative report condition, the home location server 50 repeatedly performs location calculation and location information delivery based on the report condition, rather than ending the location calculation process only with one location information delivery as in step 870. Therefore, steps 870 to 897 are to the same as steps 835 to 865, and represent a process of delivering additional location information.

As is apparent from the foregoing description, the embodiments of the present invention implement a common location service request/response method using SIP, such that the clients and servers utilizing SIP can use the SIP intactly, without the need for a separate protocol for requesting the location information. Further, when the SIP protocol is extended and applied to other services, the location information acquired based on the SIP protocol can be used for increasing a level of the other services.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A location server in a system for providing location information of a terminal, the location server comprising:
a location server for receiving a location request message for requesting a location of a target terminal from a client, determining if a location request condition set by the client is included in the location request message, calculating location information of the target terminal, determining if the location request condition is satisfied when the location request condition is included in the location request message, and sending a location response message including the calculated location information to the client, when the location request condition is satisfied;
wherein the location request message includes at least one target terminal ID, an accuracy of the location information, and a location request condition; and wherein the location request condition comprises at least one of a number of times the client intends to receive the location information, and a time at which the client intends to receive the location information.

2. The location server of claim 1, wherein the location request message comprises a Session Initiation Protocol (SIP) SUBSCRIBE message, and the location response message comprises a SIP NOTIFY message.

3. The location server of claim 1, wherein when the location request condition is not included in the location request message, the location server includes the calculated location information in the location response message.

4. The location server of claim 1, wherein the system includes:
a SIP core for forwarding the location request message from the client to the location server, and forwarding the location response message from the location server to the client.

5. The location server of claim 1, wherein the location server comprises:
a requesting location server for receiving the location request message, authenticating the client, checking if the client is authorized to receive a location of the target terminal, and sending a message indicating success in the authentication to the client, when the authentication is successful; and
a home location server for calculating the location information of the target terminal by performing a positioning process with the target terminal, when a location request of the target terminal is received from the requesting location server, and transmitting the calculated location information to the requesting location server;
wherein the requesting location server generates the location response message including the calculated location information, when the calculated location information is received from the home location server.

6. The location server of claim 1, wherein the location request message and the location response message each comprise a SIP MESSAGE.

7. A method for providing location information of a terminal in a system by a location server, the method comprising:
receiving, by the location server, a location request message for requesting a location of the target terminal;
determining, by the location server, if a location request condition set by the client is included in the received location request message;
calculating, by the location server, location information of the target terminal;
determining whether the location request condition is satisfied, when the location request condition is included in the location request message;
sending, by the location server, a location response message including the calculated location information to the client, when the location request condition is satisfied,
wherein the location request message includes at least one target terminal ID, an accuracy of the location information, and a location request condition; and
wherein the location request condition comprises at least one of a number of times the client intends to receive the location information, and a time at which the client intends to receive the location information.

8. The method of claim 7, wherein the location request message includes a Session Initiation Protocol (SIP) SUBSCRIBE message, and the location response message includes a SIP NOTIFY message.

9. The method of claim 7, further comprising:
determining, by the location server, if the location information of the target terminal is calculated, when the location request condition is not included in the location request message; and
including, by the location server, the calculated location information in the location response message and sending the location response message, when the location information is calculated.

10. The method of claim 7, further comprising:
upon receipt of the location request message, authenticating, by the location server, the client;
checking if the client has authorization to acquire a location of the target terminal; and
sending a message indicating success in the authentication to the client, when the authentication is successful.

11. The method of claim 7, wherein the location request message and the location response message each include a Session Initiation Protocol (SIP) MESSAGE.

12. The method of claim 7, wherein the client server includes a Session Initiation Protocol (SIP) application server.

13. A location server in a system for providing location information of a terminal, the location server comprising:
a requesting location server for receiving the location request message for requesting a location of a target terminal from a client, and sending the location request message depending on information on a target terminal designated in the location request message; and
a home location server for receiving the location request message from the requesting location server, and transmitting location information acquired by location calculation with the designated target terminal to the requesting location server using a location response message, determining if a location request condition set by the client is included in the location request message;
wherein the requesting location server forwards the location response message to the client;
wherein the location request message includes at least one target terminal ID, an accuracy of the location information and a location request condition; and
wherein the location request condition includes at least one of a number of times the client intends to receive the location information, and a time at which the client intends to receive the location information.

14. The location server of claim 13, wherein the location request message comprises a Session Initiation Protocol (SIP) SUBSCRIBE message, and the location response message comprises a SIP NOTIFY message.

15. The location server of claim 13, wherein the requesting location server and the home location server exchange messages through a Session Initiation Protocol (SIP) core.

16. The location server of claim 13, wherein the information on the designated target terminal comprises an IDentifier (ID) or a group Uniform Resource Identifier (URI) of the designated target terminal.

17. The location server of claim 16, wherein when the information on the designated target terminal is a group URI, the requesting location server sends the location request message to each home location server managing at least one target terminal corresponding to the group URI.

18. A method for providing location information of a terminal in a system by a location server, and a home location server, the method comprising:
receiving a location request message for requesting a location of a target terminal from a client from a client;

analyzing, by the requesting location server, information on a target terminal designated in the location request message;

sending the location request message to a home location server managing the designated target terminal depending on the analysis result;

sending, by the home location server, location information acquired by location calculation with the designated target terminal, to the requesting location server using a location response message;

determining if a location request condition set by the client is included in the location request message;

forwarding, by the requesting location server, the location response message to the client;

wherein the location request message includes at least one target terminal ID, an accuracy of the location information and a location request condition; and wherein the location request condition includes at least one of a number of times the client intends to receive the location information, and a time at which the client intends to receive the location information.

19. The method of claim 18, wherein the location request message includes a Session Initiation Protocol (SIP) SUBSCRIBE, and the location response message includes a SIP NOTIFY.

20. The method of claim 18, wherein the location request message from the requesting location server and the location response message from the home location server are exchanged through a Session Initiation Protocol (SIP) core.

21. The method of claim 18, wherein the information on the designated target terminal includes an IDentifier (ID) or a group Uniform Resource Identifier (URI) of the designated target terminal.

22. The method of claim 21, wherein sending the location request message to the home location server managing the designated target terminal comprises:

when the information on the designated target terminal is a group URI, sending, by the requesting location server, the location request message to each home location server managing at least one target terminal corresponding to the group URI.

23. A client in a system for providing location information of a terminal, the client comprising:

a client for selecting at least one target terminal for requesting location information from a user, setting at least one of a number of times which the client intends to receive the location information, and a time at which the client intends to receive the location information, generating a location request message for requesting a location of the target terminal and transmitting the location request message to a location server, wherein the location request message includes at least one target terminal ID, at least one of the number of times which the client intends to receive the location information, and the time at which the client intends to receive the location information.

24. The client of claim 23, wherein the location request message comprises a Session Initiation Protocol (SIP) SUBSCRIBE message, and the location response message comprises a SIP NOTIFY message.

25. The client of claim 24, wherein the client comprises a client terminal or a client server.

26. The client of claim 25, wherein the client server comprises a SIP application server.

* * * * *